(12) United States Patent
Abe et al.

(10) Patent No.: US 8,561,763 B2
(45) Date of Patent: Oct. 22, 2013

(54) BRAKE DEVICE

(75) Inventors: Kenji Abe, Toyota (JP); Hiroshi Isono, Mishima (JP); Yoshitomo Denou, Mishima (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 209 days.

(21) Appl. No.: 13/124,332

(22) PCT Filed: Jun. 15, 2009

(86) PCT No.: PCT/JP2009/060869
§ 371 (c)(1),
(2), (4) Date: Apr. 14, 2011

(87) PCT Pub. No.: WO2010/146649
PCT Pub. Date: Dec. 23, 2010

(65) Prior Publication Data
US 2011/0198162 A1 Aug. 18, 2011

(51) Int. Cl.
*F16D 65/02* (2006.01)
(52) U.S. Cl.
USPC ............... 188/218 XL; 188/250 G; 188/73.1
(58) Field of Classification Search
USPC ...... 188/73.1, 250 B, 250 G, 251 M, 218 XL; 428/143, 147; 192/107 R, 107 M, 107 C
See application file for complete search history.

(56) References Cited

U.S. PATENT DOCUMENTS 3,073,424 A * 1/1963 Russell .................... 192/113.36
3,835,963 A * 9/1974 Ohtani ......................... 188/73.1
3,841,949 A * 10/1974 Black ............................ 428/66.2
3,899,050 A * 8/1975 Savary et al. ................. 188/73.1

(Continued)

FOREIGN PATENT DOCUMENTS

JP 50-140770 A 11/1975
JP 2002-257168 A 9/2002

OTHER PUBLICATIONS

English Translation of International Preliminary Report on Patentability (Chapter 1) dated Jan. 26, 2012 of counterpart Japanese Patent Application No. PCT/JP2009/060869.

*Primary Examiner* — Christopher Schwartz
(74) *Attorney, Agent, or Firm* — Sughrue Mion, PLLC

(57) ABSTRACT

A brake device includes a pad 100a having a friction surface 101 and a disk 200a having a friction surface 201 sliding on the friction surface 101. The friction surface 101 includes hard particles 102 that are elastically supported in a y direction perpendicular to the friction surface 201. The friction surface 201 includes a plurality of convex portions 202 that is disposed in a direction where the friction surface 201 slides on the friction surface 101. When the friction surface 201 slides on the friction surface 101, the hard particles 102 continuously come into contact with the convex portions 202, respectively, while being displaced in the y direction perpendicular to the friction surface 201. Accordingly, the brake device can improve abrasion resistance as compared to a brake device that mainly performs abrasive friction. When the hard particle 102 comes into contact with the next convex portion 202 after coming into contact with one convex portion 202, the hard particle 102 comes into contact with the convex portion 202 at a position lower than the apex of the convex portion 202. Accordingly, the hard particles 102 continuously come into contact with the convex portions 202 so as to follow the convex portions 202, respectively. Therefore, it may be possible to obtain a larger frictional force.

6 Claims, 17 Drawing Sheets

(56) References Cited

U.S. PATENT DOCUMENTS

| | | | |
|---|---|---|---|
| 4,042,085 A * | 8/1977 | Bjerk et al. | 192/57 |
| 4,501,347 A * | 2/1985 | Cerny et al. | 188/250 G |
| 5,219,462 A * | 6/1993 | Bruxvoort et al. | 51/293 |
| 5,500,273 A * | 3/1996 | Holmes et al. | 428/147 |
| 5,819,888 A * | 10/1998 | Tamura et al. | 188/218 XL |
| 6,524,681 B1 * | 2/2003 | Seitz et al. | 428/143 |
| 2003/0213658 A1 * | 11/2003 | Baba | 188/73.37 |
| 2012/0037465 A1 * | 2/2012 | Abe et al. | 188/73.1 |
| 2012/0073914 A1 * | 3/2012 | Abe et al. | 188/73.1 |
| 2012/0103735 A1 * | 5/2012 | Abe et al. | 188/73.1 |

* cited by examiner

*Fig.5*

| DAMPING CONSTANT | FOLLOWING PERFORMANC | HEAT EXCHANGE EFFICIENCY |
|---|---|---|
| LARGE | BAD | GOOD |
| SMALL | GOOD | BAD |

BRAKE DEVICE

CROSS REFERENCE TO RELATED APPLICATIONS

This application is a National Stage of International Application No. PCT/JP2009/060869 filed Jun. 15, 2009, the contents of all of which are incorporated herein by reference in their entirety.

TECHNICAL FIELD

The present invention relates to a brake device, and more particularly, to a brake device that includes a pair of friction members having friction surfaces.

BACKGROUND ART

A brake device in the related art, which includes a rotor (disk) and a pad of a brake for an automobile, is formed by the combination of a relatively hard member and a soft member. For this reason, the brake device in the related art has a problem in that the performance of a brake is poor or any one of the members is apt to be worn out. For example, a brake device, which is formed of the combination of a non-steel pad made of a soft resin-based ingredient and a harder cast-iron rotor and generates a frictional force by adhesion friction, has a problem in that the performance of a brake is poor. Further, a brake device, which is formed of the combination of a low-steel pad made of a hard steel fiber and a softer cast-iron rotor and generates a frictional force by abrasive friction, has a problem in that the rotor is greatly abraded.

Accordingly, a brake pad, a brake disk, and a brake including the pad are disclosed in, for example, Patent Literature 1. In order to improve abrasion resistance, the brake pad and the brake disk are manufactured by disposing and forming composite members, which are excellent in abrasion resistance and are made of at least silicon carbide and metal silicon, on the surface of a base material of a C/C composite, which is composite carbon fiber, at a predetermined ratio.

CITATION LIST

Patent Literature
  [Patent Literature 1] Japanese Unexamined Patent Application Publication No. 2002-257168

SUMMARY OF INVENTION

Technical Problem

A brake device where hard members are disposed on both the pad and the disk as described above has an advantage in that both the pad and the disk are abraded to a far lesser extent. However, a frictional force (friction coefficient) between the pad and the disk is not necessarily high in the brake device where hard members are disposed on both the pad and the disk as described above.

The invention has been made in consideration of the above-mentioned circumstances, and an object of the invention is to provide a brake device that can obtain a larger frictional force without sacrificing abrasion resistance.

Solution to Problem

According to an aspect of the invention, there is provided a brake device that includes a first friction member and a second friction member. The first friction member includes a first friction surface. The second friction member includes a second friction surface moving relative to the first friction surface. The first friction surface includes first convex portions that are elastically supported in a direction perpendicular to the second friction surface. The second friction surface includes a plurality of second convex portions that is disposed in a direction where the second friction surface moves relative to the first friction surface. The second friction surface moves relative to the first friction surface, the first convex portions continuously come into contact with the second convex portions, respectively, while being displaced in a direction perpendicular to the second friction surface. When the first convex portion comes into contact with the next second convex portion after coming into contact with one second convex portion, the first convex portion comes into contact with the second convex portion at a position lower than an apex of the second convex portion.

According to this structure, a brake device includes a first friction member that includes a first friction surface, and a second friction member that includes a second friction surface moving relative to the first friction surface. The first friction surface includes first convex portions that are elastically supported in a direction perpendicular to the second friction surface. The second friction surface includes a plurality of second convex portions that is disposed in a direction where the second friction surface moves relative to the first friction surface. When the second friction surface moves relative to the first friction surface, the first convex portions continuously come into contact with the second convex portions, respectively, while being displaced in a direction perpendicular to the second friction surface. Accordingly, the brake device can improve abrasion resistance as compared to a brake device that mainly performs abrasive friction. Further, when the first convex portion comes into contact with the next second convex portion after coming into contact with one second convex portion, the first convex portion comes into contact with the convex portion at a position lower than an apex of the second convex portion. Accordingly, the first convex portions continuously come into contact with the second convex portions so as to follow the second convex portions, respectively. Therefore, it may be possible to obtain a larger frictional force.

In this case, when the second friction surface moves relative to the first friction surface, the first convex portion may come into contact with the second friction surface between one second convex portion and the next second convex portion until the first convex portion comes into contact with the next second convex portion after coming into contact with one second convex portion.

According to this structure, when the second friction surface moves relative to the first friction surface, the first convex portion comes into contact with the second friction surface between one second convex portion and the next second convex portion until the first convex portion comes into contact with the next second convex portion after coming into contact with one second convex portion. Accordingly, a frictional force is also generated between the first convex portion and the second friction surface that is formed between one second convex portion and the next second convex portion. Therefore, it may be possible to obtain a much larger frictional force.

Further, the first convex portions may be elastically supported in a direction parallel to the second friction surface. When the second friction surface moves relative to the first friction surface, the first convex portions may continuously come into contact with side surfaces of the second convex portions, respectively, while being displaced in a direction parallel to the second friction surface. When the first convex portion comes into contact with the side surface of the next second convex portion after coming into contact with the side surface of one second convex portion, the first convex portion may come into contact with the second convex portion at a position closer to the center of the second convex portion than the side end of the second convex portion in a direction perpendicular to the direction where the second friction surface moves relative to the first friction surface.

According to this structure, the first convex portions are elastically supported in a direction parallel to the second friction surface. When the second friction surface moves relative to the first friction surface, the first convex portions continuously come into contact with side surfaces of the second convex portions, respectively, while being displaced in a direction parallel to the second friction surface. When the first convex portion comes into contact with the side surface of the next second convex portion after coming into contact with the side surface of one second convex portion, the first convex portion comes into contact with the second convex portion at a position closer to the center of the second convex portion than the side end of the second convex portion in a direction perpendicular to the direction where the second friction surface moves relative to the first friction surface. Accordingly, even in the direction parallel to the second friction surface, the first convex portions continuously come into contact with the second convex portions so as to follow the second convex portions, respectively. Therefore, it may be possible to obtain a much larger frictional force.

In this case, the second friction surface may include the plurality of second convex portions that is disposed in zigzag so as to form lines in the direction where the second friction surface moves relative to the first friction surface. When the second friction surface moves relative to the first friction surface, the first convex portions may continuously come into contact with the side surfaces of the second convex portions, which are disposed in zigzag so as to form lines, respectively.

According to this structure, the second friction surface includes the plurality of second convex portions that is disposed in zigzag so as to form lines in the direction where the second friction surface moves relative to the first friction surface. When the second friction surface moves relative to the first friction surface, the first convex portions continuously come into contact with the side surfaces of the second convex portions, which are disposed in zigzag so as to form lines, respectively. Accordingly, the first convex portions more efficiently and continuously come into contact with the side surfaces of the second convex portions in the direction parallel to the second friction surface, respectively. Therefore, it may be possible to obtain a much larger frictional force.

Advantageous Effects of Invention

According to the brake device of the invention, it may be possible to obtain a larger frictional force without sacrificing abrasion resistance.

BRIEF DESCRIPTION OF DRAWINGS

FIG. 5 is a table showing a relationship between heat exchange efficiency and following performance in regard to the damping constant of the pad.

DESCRIPTION OF EMBODIMENTS

Brake devices according to embodiments of the invention will be described below with reference to the drawings.

In a first embodiment of the invention, a brake device according to the invention is applied to a disk brake of an automobile. A pad $100a$ is pressed against a rotating disk $200a$ as shown in FIG. 1, so that a disk brake generates a frictional force.

Figure 1:
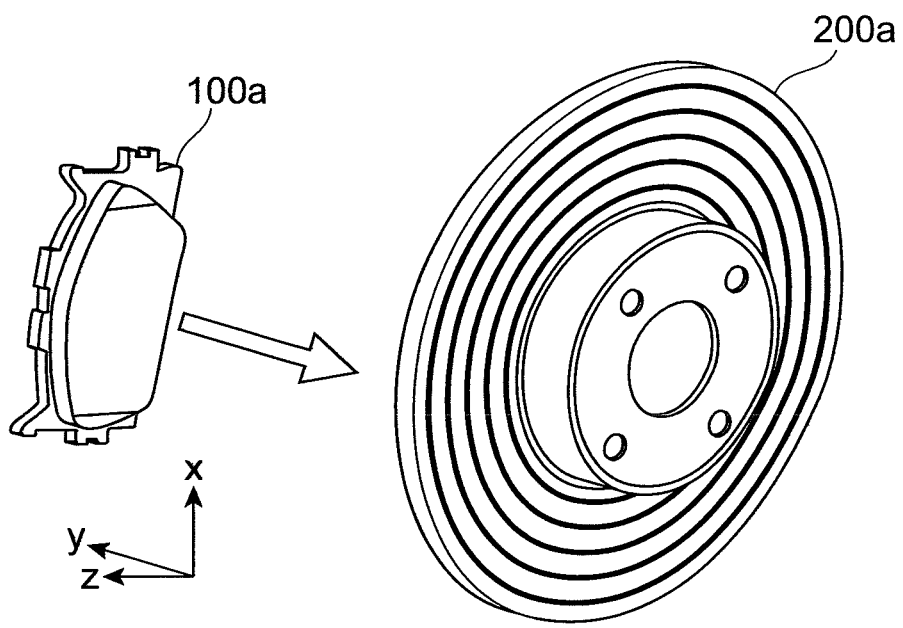
FIG. 1 is a perspective view showing a pad and a disk according to a first embodiment.
Figure 2:
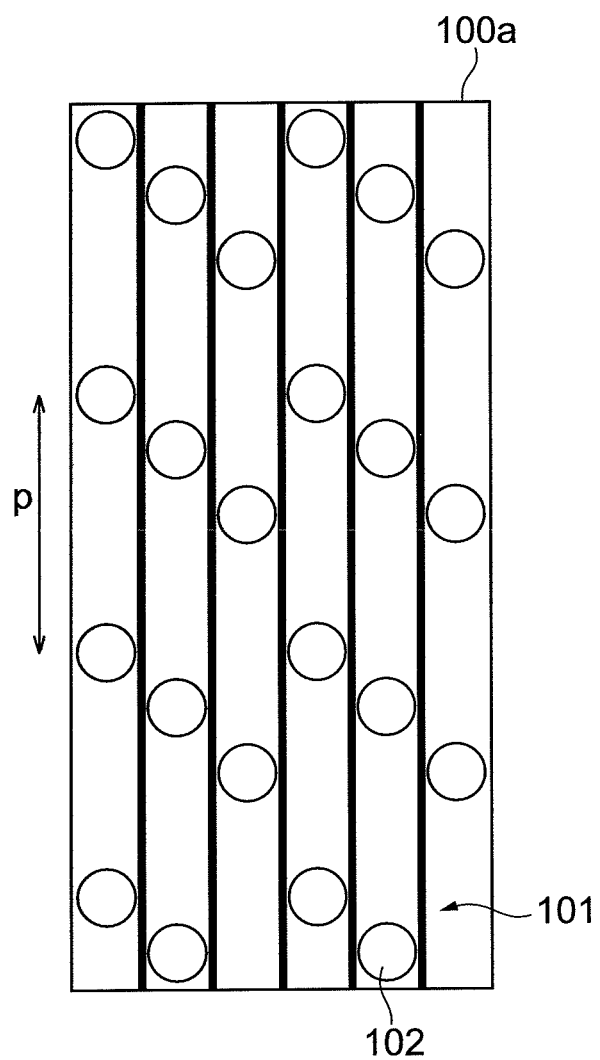
FIG. 2 is a plan view showing a friction surface of the pad according to the first embodiment.

As shown in FIG. 2 that is a plan view of the pad $100a$ viewed in the y direction of FIG. 1, a plurality of hard particles 102 is arranged in a plurality of lines on a friction surface 101 of the pad $100a$ in a direction where the disk $200a$ slides on the pad $100a$. The diameter of the hard particle 102 is in the range of 5 to 20 μm, and preferably, in the range of 8 to 15 μm. Further, a gap p between the hard particles 102, which are arranged in a line, is in the range of 50 to 150 μm, and preferably, in the range of 90 to 110 μm. The hard particle 102 is made of ceramics, such as $Si_3N_4$, $Al_2O_3$, $ZrO_2$, or the like.

Figure 3:
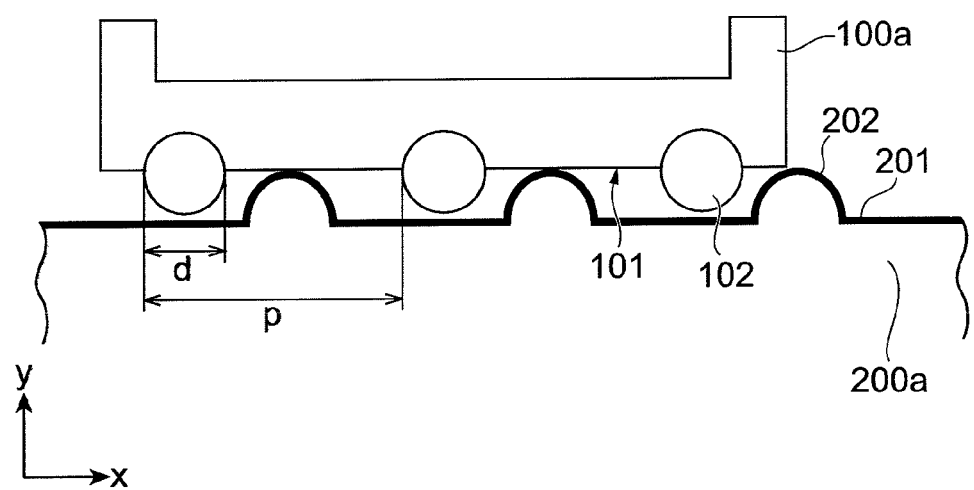
FIG. 3 is a side view showing a state where the pad and the disk according to the first embodiment come into contact with each other.

As shown in FIG. 3 that is a side view of the pad 100a and the disk 200a viewed in the z direction of FIG. 1, a plurality of convex portions 202 is arranged in a plurality of lines even on a friction surface 201 of the disk 200a in a direction where the disk 200a slides on the pad 100a. The hard particles 102 and the convex portions 202 have the same size and gap. The disk 200a and the pad 100a are disposed so that the middle portions of the hard particles 102 and the convex portions 202 come into contact with each other when the disk 200a slides on the pad 100a.

It is preferable that the hard particles 102 of the pad 100a and the convex portions 202 of the disk 200a have a hardness of an extent so as not to be worn out during braking or a Mohs hardness of 9 or more. Further, it is preferable that the hard particles 102 of the pad 100a and the convex portions 202 of the disk 200a be made of the same material or a material having the same Mohs hardness.

Figure 4:
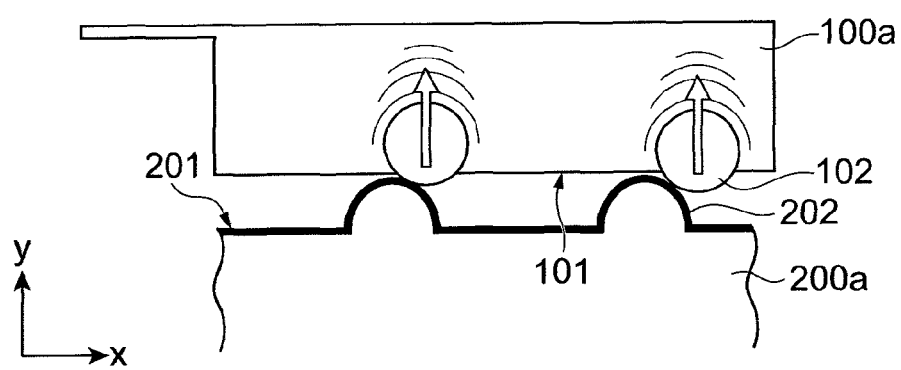
FIG. 4 is a side view showing a state where the pad and the disk according to the first embodiment come into contact with each other.

The hard particles 102 are elastically supported by an elastic support body such as an organic compound (a mixture containing 50% or more of a resin-based organic ingredient such as rubber or a resin) so as to have a predetermined spring constant and a predetermined damping constant on the pad 100a. For this reason, when the disk 200a slides on the pad 100a, the hard particles 102 continuously come into contact with the convex portions 202, respectively, while being displaced in a direction perpendicular to the friction surface 202 of the disk 200a (in the y direction in FIG. 4) as shown in FIG. 4. Further, in this case, when the hard particle 102 comes into contact with the next convex portion 202 after coming into contact with one convex portion 202, the hard particle 102 comes into contact with the convex portion 202 at a position lower than the apex of the convex portion 202.

The operation effect of the brake device according to this embodiment will be described below. In general, a dry friction phenomenon between hard members, which have a small difference in hardness, is significantly affected by both adhesion friction and heat conversion using damping. Meanwhile, the above-mentioned abrasive friction has a principle where one hard friction member scrapes the other friction member which is softer than the one hard friction member. The dry friction phenomenon between hard members, which have a small difference in hardness, is less affected by the abrasive friction.

The principle of the heat conversion using damping is as follows: the hard particles 102, which are elastically supported, are displaced by the convex portions 202. Accordingly, if the hard particles 102 are supported so as to have a predetermined damping constant, the kinetic energy of the disk 200a is converted into heat. Therefore, speed can be reduced. As shown in FIG. 5, if a damping constant is large, the following performance to the convex portions 202 deteriorates but heat exchange efficiency becomes good. Meanwhile, if a damping constant is small, the following performance to the convex portions 202 becomes good but heat exchange efficiency deteriorates.

Further, this embodiment makes it a condition that the speed of use of an automobile is assumed to be, for example, 220 km/h and the hard particles 102 are displaced so as to follow the convex portions 202 in the range of 220 km/h or less, so that a large braking force is obtained by the heat exchange using damping. In this embodiment, it is assumed that an elastic member supporting the hard particles 102 and having an appropriate damping constant C is determined, and the concavo-convex shape of the friction surfaces 101 and 201 is optimized. The condition of the hard particle 102 includes the diameter of the hard particle 102 and a distance between the hard particles.

Figure 6:
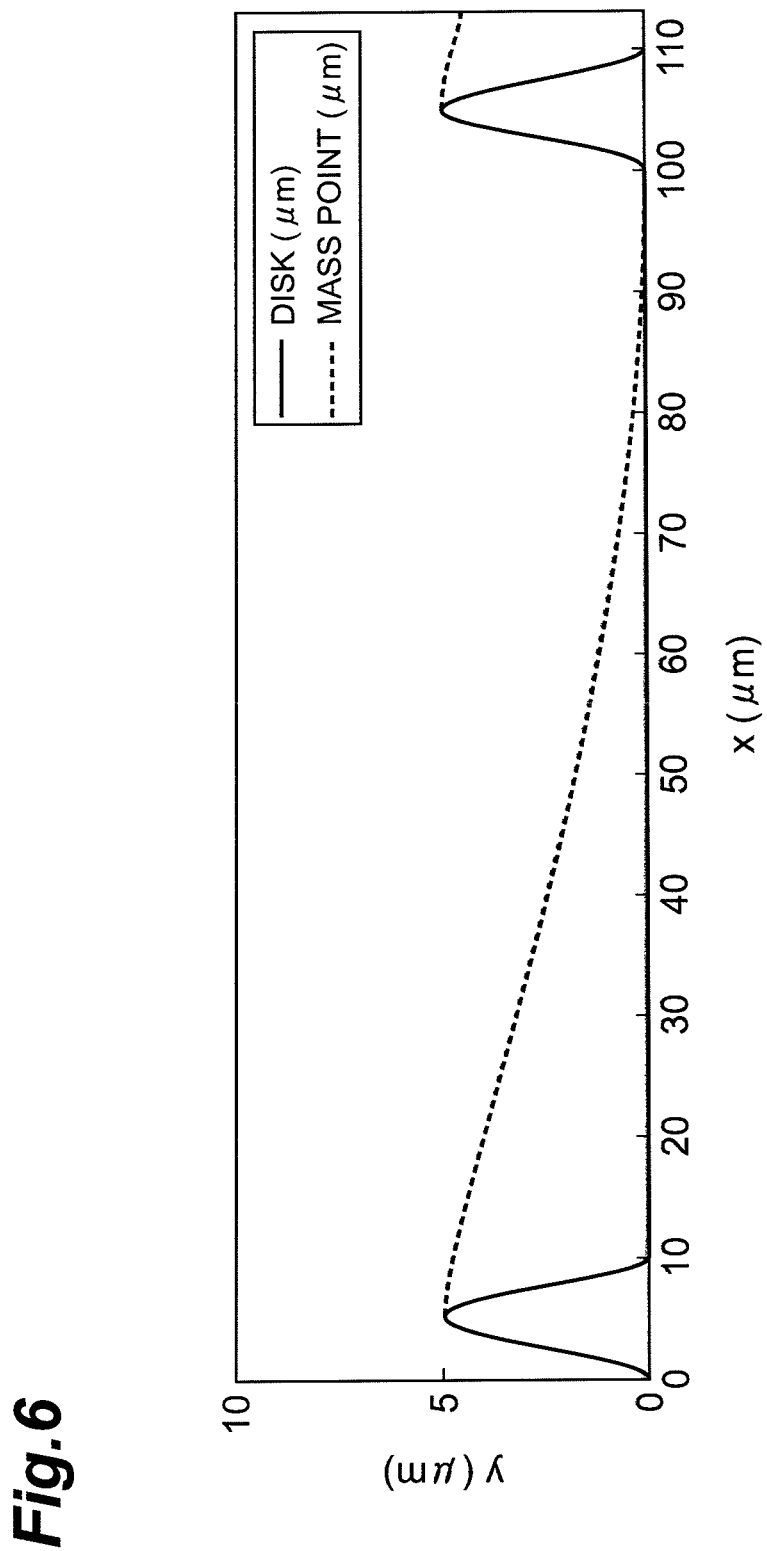
FIG. 6 is a graph showing the displacement of the mass point of a hard particle relative to the friction surface of the disk.
Figure 7:
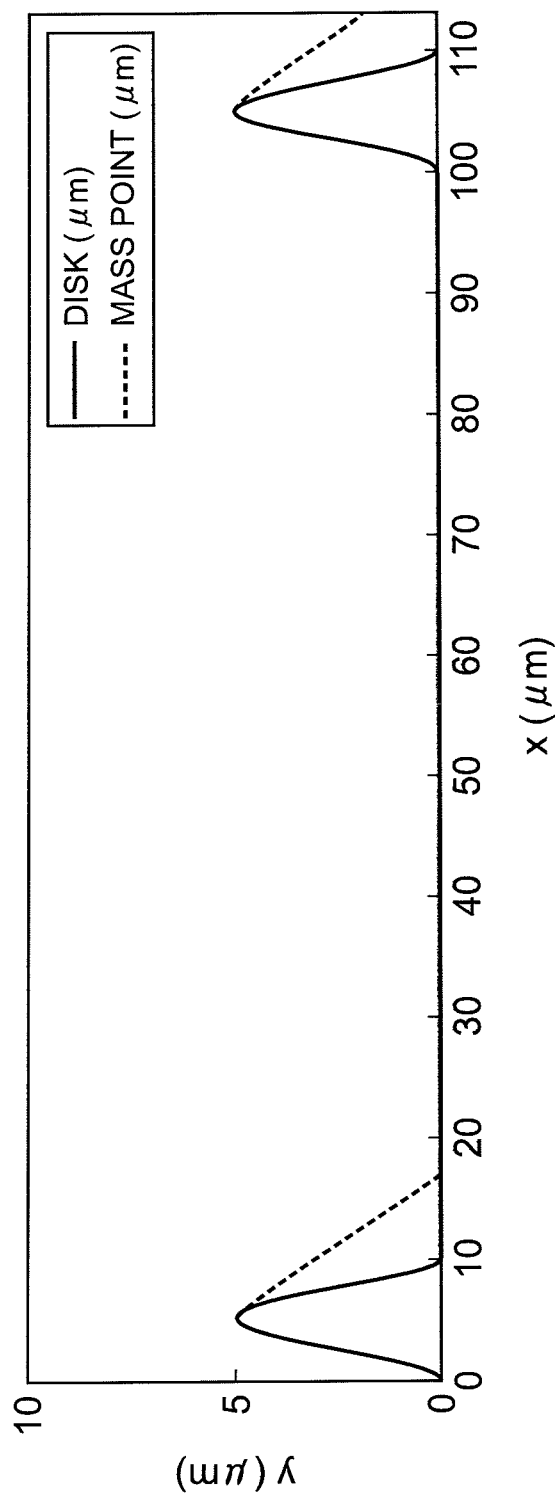
FIG. 7 is a graph showing the displacement of the mass point of a hard particle relative to the friction surface of the disk.

While an automobile travels at the upper limit of use speed, that is, 220 km/h, the trajectory of the hard particle 102 shown by a broken line is changed from the apex of the convex portion 202 to the bottom of the convex portion, as shown in FIG. 6, between the adjacent convex portions 202 of the disk 200a shown by a solid line. Accordingly, a damping mechanism needs to be sufficiently used. In this case, the gap between the convex portions 202 needs to be 90 μm or more. Meanwhile, if the speed of an automobile is 40 km/h, the trajectory of the hard particle 102 supported by the elastic member having the same damping constant further follows the convex portion 202 as shown in FIG. 7.

Figure 8:
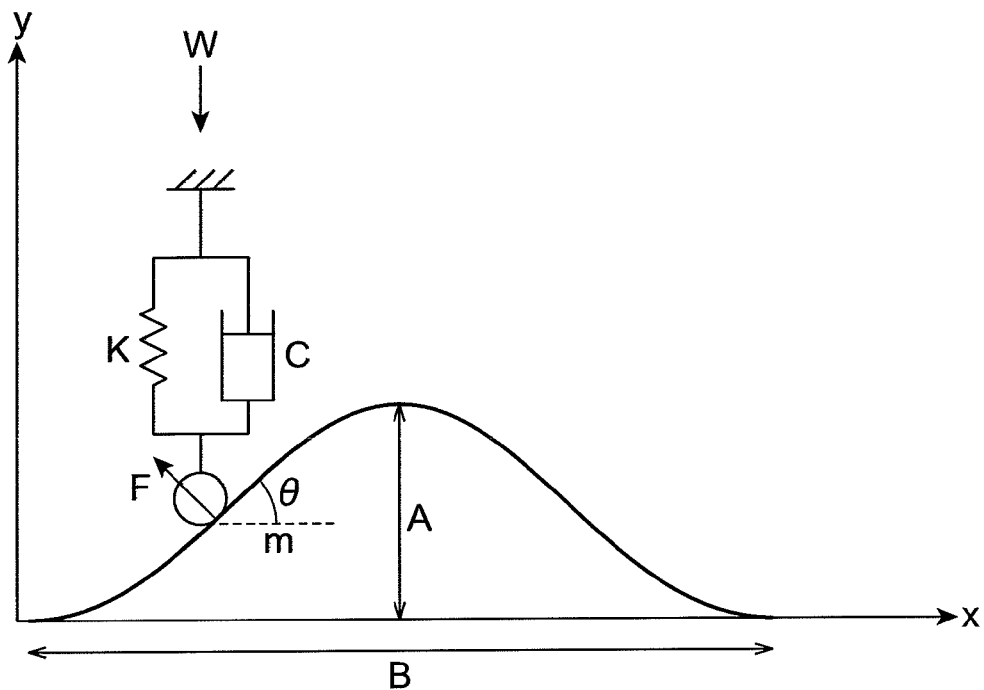
FIG. 8 is a view illustrating a model that represents the spring constant and the damping constant of the pad.

The trajectory of the hard particle 102 will be considered below. It is assumed that the hard particle 102 is displaced so as to follow the sinusoidal convex portion 202 having an amplitude A and a wavelength B as shown in FIG. 8. It is assumed that the hard particle 102 having a mass m is supported by an elastic member, which has a spring constant K and a damping constant C, so as to be pushed against the convex portion 202 by a pushing force W.

The sinusoidal convex portion 202, which has the amplitude A and the wavelength B, satisfies the following expression (1).

[Expression 1]

$$y = A\left(1 - \cos\frac{2\pi x}{B}\right) \quad (1)$$

$$\dot{y} = 2\pi\frac{A}{B}\sin\frac{2\pi x}{B}$$

$$\ddot{y} = 4\pi^2\frac{A}{B^2}\cos\frac{2\pi x}{B}$$

Further, an angle θ between the surface of the convex portion 202 and a horizontal plane satisfies the following expression (2).

[Expression 2]

$$\tan\theta = \frac{dy}{dx} = 2\pi\frac{A}{B}\sin\frac{2\pi x}{B} \quad (2)$$

An equation of motion about the hard particle 102 satisfies the following expressions (3) and (4).

[Expression 3]

$$m\ddot{y} = F\cos\theta - Ky - C\dot{y} - W \quad (3)$$

$$m\ddot{x} = -F\sin\theta \quad (4)$$

The following expression (5) is satisfied by the expression (3).

[Expression 4]

$$F = \frac{1}{\cos\theta}(Ky + C\dot{y} + m\ddot{y} + W) \quad (5)$$

$$= \frac{A}{\cos\theta}\left(K - K\cos\frac{2\pi x}{B} + C\frac{2\pi}{B}\sin\frac{2\pi x}{B} + m\frac{4\pi^2}{B^2}\cos\frac{2\pi x}{B}\right) + \frac{W}{\cos\theta}$$

When the expression (5) is substituted in the expression (4), the following expression (6) is satisfied.

[Expression 5]

$$m\ddot{x} = \frac{\sin\theta}{\cos\theta}\left\{A\left(K - K\cos\frac{2\pi x}{B} + C\frac{2\pi}{B}\sin\frac{2\pi x}{B} + m\frac{4\pi^2}{B^2}\cos\frac{2\pi x}{B}\right) + W\right\} \qquad (6)$$

$$= 2\pi\frac{A}{B}\sin\frac{2\pi x}{B}\left\{A\left(K - K\cos\frac{2\pi x}{B} + C\frac{2\pi}{B}\sin\frac{2\pi x}{B} + m\frac{4\pi^2}{B^2}\cos\frac{2\pi x}{B}\right) + W\right\}$$

If an energy loss x' is represented by $2\pi x/B$ when the hard particle 102 gets over one convex portion 202, the following expression (7) is satisfied.

[Expression 6]

$$m\int_0^B \ddot{x}\,dx = m\int_0^{2\pi} \ddot{x}\frac{dx}{dx'}\,dx' \qquad (7)$$

$$= A\left[AK\cos x' - AK\frac{1}{4}\cos 2x' - \frac{2\pi A}{B}C\left(\frac{1}{2}x' - \frac{1}{4}\sin 2x'\right) + m\frac{4\pi^2 A}{B^2}\cos 2x' + W\cos x'\right]_0^{2\pi}$$

$$= -\frac{2\pi^2 A^2}{B}C$$

Figure 9:
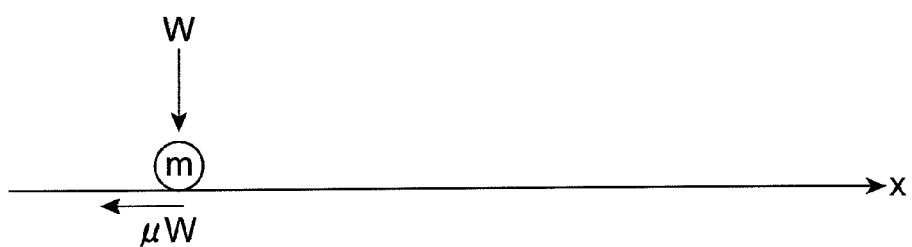
FIG. 9 is a view showing lost energy when a hard particle slides on a friction surface.

Meanwhile, when a hard particle 102 moves by a distance B on a flat surface having a friction coefficient μ as shown in FIG. 9, lost energy (the amount of work) is represented by the following expression (8).

[Expression 7]

$$-\mu WB \qquad (8)$$

As for a frictional force, the following expression (9) is satisfied by the expressions (7) and (8).

[Expression 8]

$$\mu W = \frac{2\pi^2 A^2}{B^2}C \qquad (9)$$

That is, it is found that a frictional force is not proportional to the pushing force W only when it is considered that the hard particle gets over only one convex portion 202. As for the frictional force of the entire pad 100*a*, the following expression (10) is satisfied.

[Expression 9]

Frictional force of the entire pad = (10)

$$\frac{2\pi^2 A^2}{B^2}C \times \text{the number of hard particles coming into contact with the disk} \propto$$

$$\frac{2\pi^2 A^2}{B^2}C \times \text{Actual contact area} \propto \frac{2\pi^2 A^2}{B^2}C \times \text{All pushing load}$$

Accordingly, as for the whole apparent friction coefficient μ, the following expression (11) is satisfied.

[Expression 10]

$$\text{Whole apparent }\mu \propto \frac{2\pi^2 A^2}{B^2}C \qquad (11)$$

That is, it is found that a frictional force is determined by the height and width of the convex portion 202 and the damping constant of an elastic body for supporting the hard particle 102.

Figure 10:
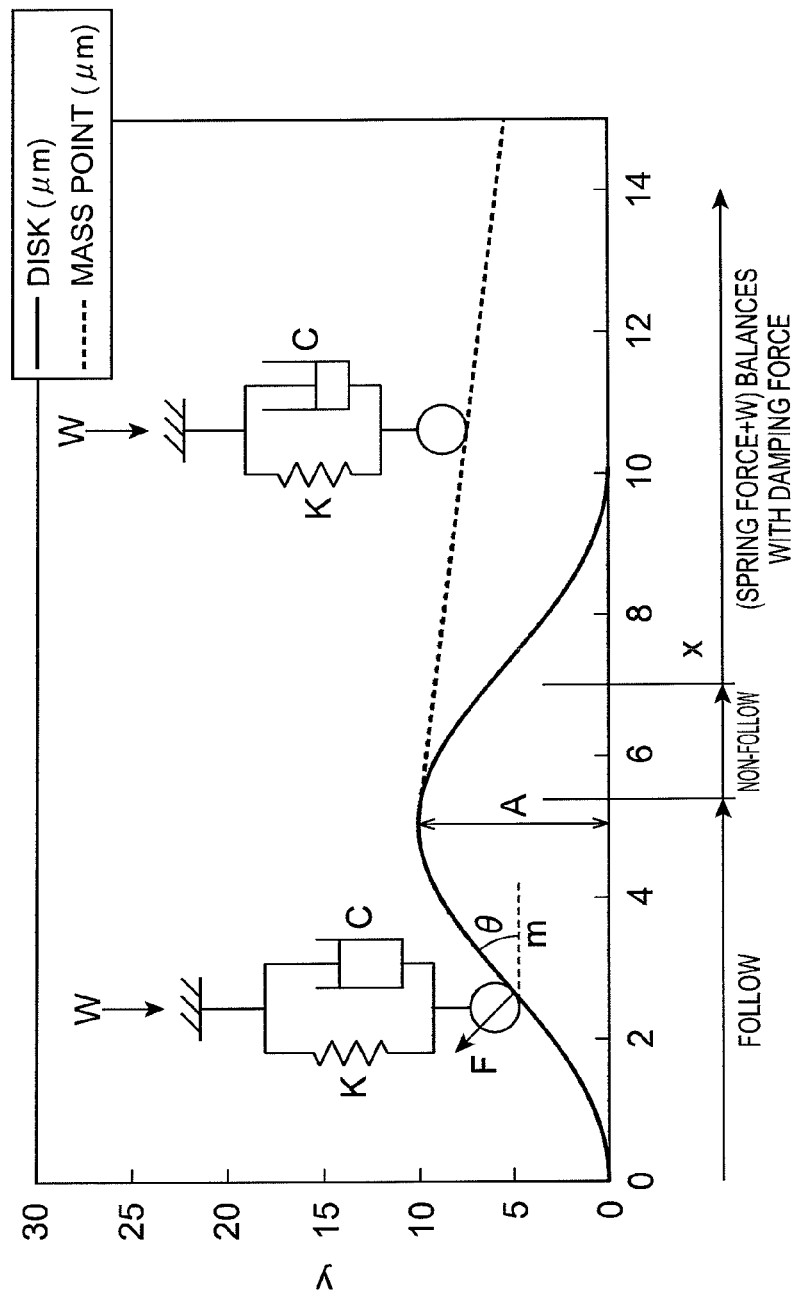
FIG. 10 is a view showing the following performance of a hard particle in regard to a model showing the spring constant and the damping constant of a pad.

The following performance to the convex portion 202 of the hard particle 102 will be described below. If the speed V of the disk 200*a* sliding on the pad 100*a* is constant in the respective states of the hard particle 102 shown in FIG. 10, the following expression (12) is satisfied.

[Expression 11]

$$X = Vt \qquad (12)$$

(1) Follow

If the displacement of the hard particle 102 in the y direction is determined by the following expression (13) when the hard particle 102 follows the convex portion 202, a follow condition is the following expression (14).

[Expression 12]

$$Y = f(x) \qquad (13)$$

[Expression 13]

$$F \geq 0 \qquad (14)$$

Accordingly, the aforementioned following expressions (2) and (3) are satisfied.

[Expression 14]

$$\tan\theta = \frac{dy}{dx} \qquad (2)$$

$$m\ddot{y} = F\cos\theta - Ky - C\dot{y} - W \qquad (3)$$

Further, the following expression (5) is satisfied by the expression (3).

[Expression 15]

$$F = \frac{1}{\cos\theta}(Ky = C\dot{y} + m\ddot{y} + W) \qquad (5)$$

(2) Non-Follow

A non-follow condition is the following expression (15).

[Expression 16]

$$F < 0 \qquad (15)$$

Accordingly, the following expression (16) is satisfied.

[Expression 17]

$$\ddot{y} = \frac{1}{m}(-Ky - C\dot{y} - W) \qquad (16)$$

(3) (Spring Force+W) Balances with a Damping Force During the Non-Follow.

A condition where the (spring force+W) is balanced with a damping force during the non-follow is the following expression (17).

[Expression 18]

$$-Ky - C\dot{y} - W > 0 \tag{17}$$

Accordingly, the following expression (18) is satisfied.

[Expression 19]

$$\dot{y} = \frac{1}{C}(-Ky - W) \tag{18}$$

(4) Landing Condition (after that, (1) Follow)

A condition where the hard particle 102 lands on the bottom of the convex portion 202 is the following expression (19).

[Expression 20]

$$y \leq A(1 - \cos x) \tag{19}$$

The inventors performed numerical computation with the above-mentioned model. It is assumed that the mass of a mass point of the hard particle 102 is $4.1 \times 10^{-12}$ kg and the specific gravity of the hard particle 102 is 7.85 g/cm$^3$ when the diameter of the hard particle 102 is assumed to 10 μm. A specific gravity of 7.85 g/cm$^3$ corresponds to the specific gravity of iron. It is assumed that the sliding speed V of the friction surface 201 of the disk 200a is 5.56 m/s. The speed V of 5.56 m/s corresponds to a case where the speed of an automobile is 40 km/h. It is assumed that a load W is $4.7 \times 10^{-4}$ N. The load W of $4.7 \times 10^{-4}$ N corresponds to a case where a pressure is 1 MPa and a density (ratio) is 0.1.

Figure 11:
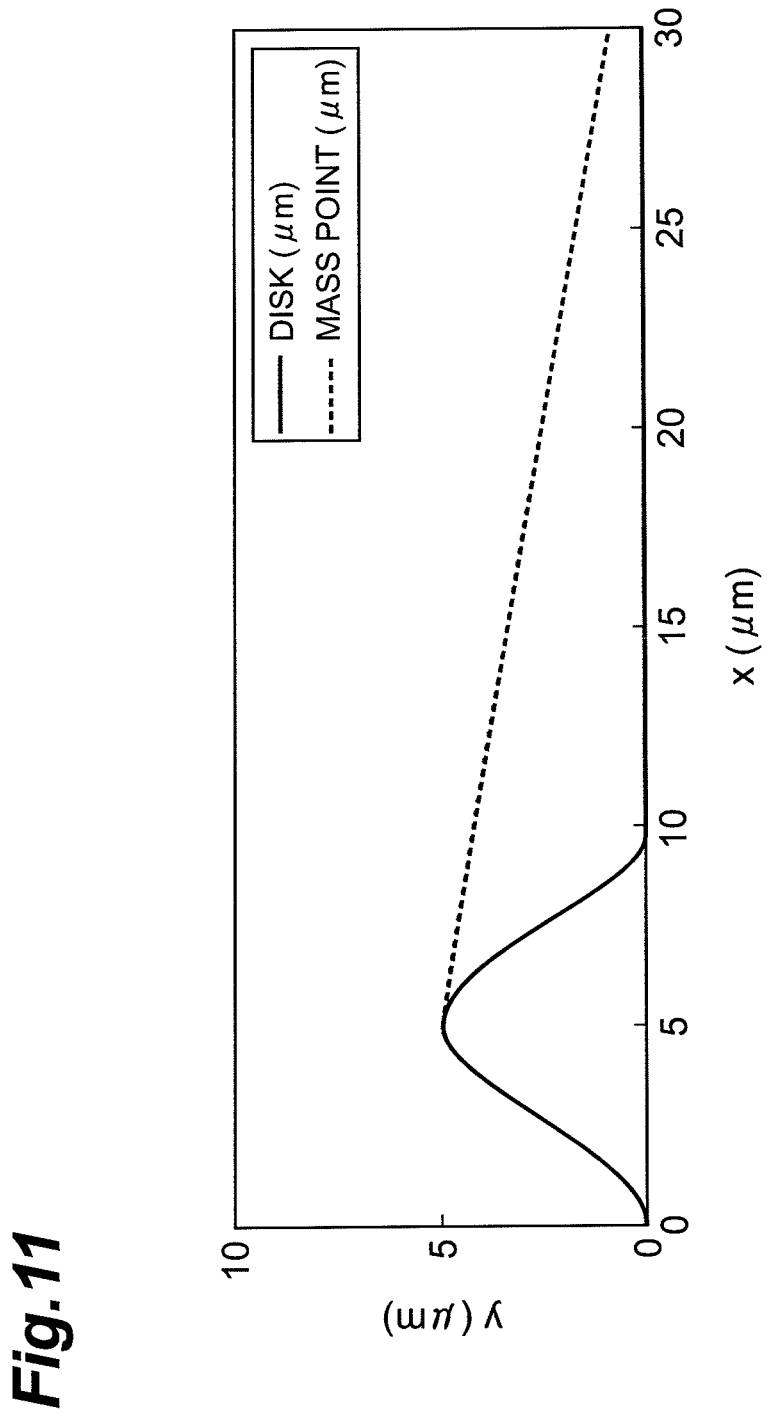
FIG. 11 is a graph showing the displacement of the mass point of a hard particle relative to the friction surface of a disk when a damping constant and a spring constant are appropriate.

In the above-mentioned condition, it is assumed that the spring constant K is 0.1 N/m. It is assumed that the damping constant C is 0.0005 N/(m/s). Meanwhile, if it is assumed that the spring constant K is 10×10 μm of a spring of 1000 N/mm per 1 mm$^2$, the spring constant K is 100 N/m. If the elastic body is made of rubber, the damping constant C is about 0.2 to 0.3% of the spring constant K. Accordingly, a damping constant C of 0.0005 N/(m/s) is quoted from the characteristics of a rubber bush. In this case, the spring constant K is appropriately balanced with the damping constant C. For this reason, as shown in FIG. 11, the hard particle 102 does not completely follow the convex portion 202. However, if the gap between one convex portion 202 and the next convex portion 202 is set optimally, it may be possible to sufficiently utilize damping. That is, the hard particle 102 strokes up and down in the y direction.

Figure 12:
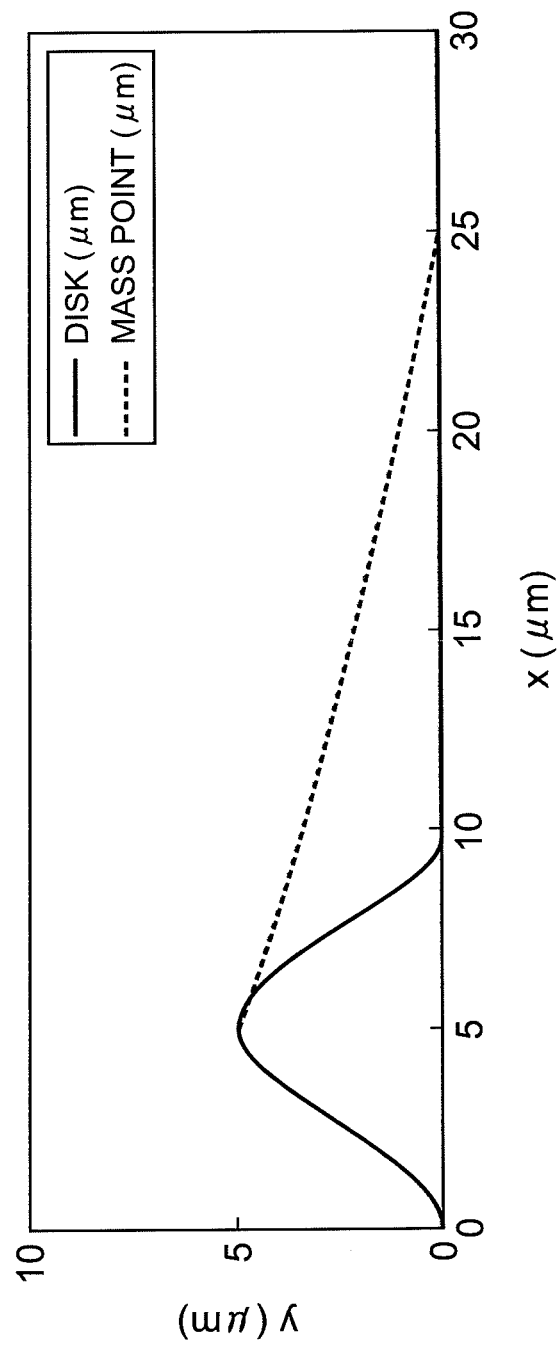
FIG. 12 is a graph showing the displacement of the mass point of a hard particle relative to the friction surface of a disk when the hard particle approaches complete follow due to a large spring constant.

It is assumed that the spring constant K is further increased and is set to 100 N/m. It is assumed that the damping constant C is 0.0005 N/(m/s). Meanwhile, if it is assumed that the spring constant K is 10×10 μm of a spring of 1000 N/mm per 1 mm$^2$, the spring constant K is 100 N/m. If the elastic body is made of rubber, the damping constant C of 0.0005 N/(m/s) is about 0.2 to 0.3% of the spring constant K. In this case, the hard particle 102 more completely follows the convex portion 202 as shown in FIG. 12.

Figure 13:
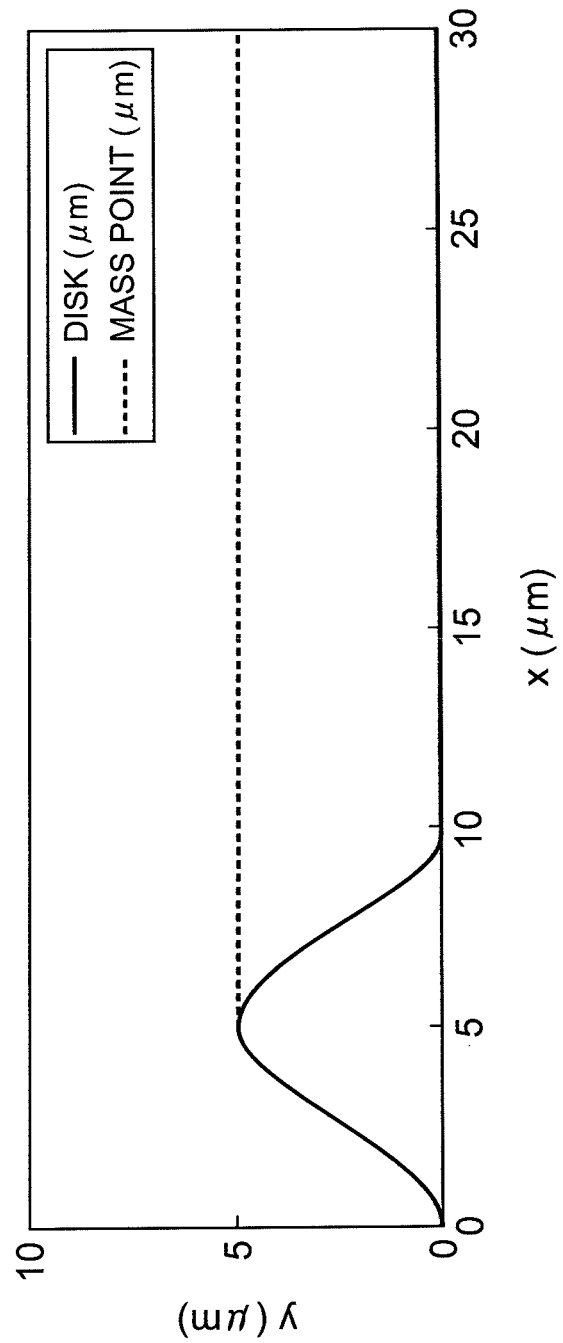
FIG. 13 is a graph showing the displacement of the mass point of a hard particle relative to the friction surface of a disk when the hard particle does not follow the concavity and convexity of the friction surface of a disk due to an excessively large damping constant.

It is assumed that the spring constant K is further increased and is set to 100 N/m. It is assumed that the damping constant C is also further increased and is set to 0.2 N/(m/s). If the elastic body is made of rubber, the damping constant C is about 0.2 to 0.3% of the spring constant K. Accordingly, a damping constant C of 0.2 N/(m/s) is quoted from the characteristics of a rubber bush. In this case, since the damping constant C is excessively large as shown in FIG. 13, the hard particle 102 does not follow the convex portion 202.

Figure 14:
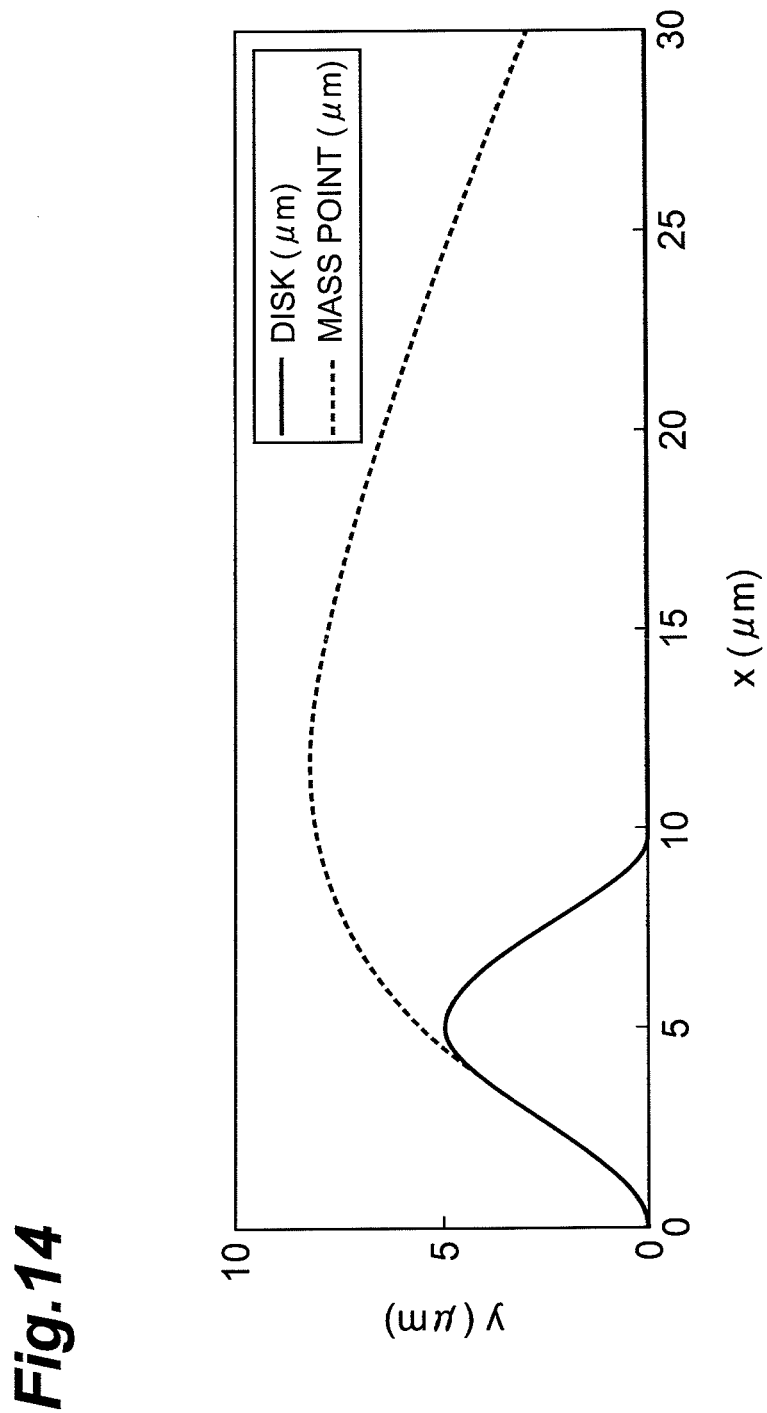
FIG. 14 is a graph showing the displacement of the mass point of a hard particle relative to the friction surface of a disk when the hard particle does not follow the concavity and convexity of the friction surface of a disk due to an excessively large specific gravity of the hard particle.

It is assumed that the mass of a mass point of the hard particle 102 is larger, that is, $5.2 \times 10^{-10}$ kg and the specific gravity of the hard particle 102 is 1000 g/cm$^3$ when the diameter of the hard particle 102 is assumed to 10 μm. Since the specific gravity of iron is 7.85 g/cm$^3$, a specific gravity of 1000 g/cm$^3$ is very large value. In this case, when the mass of a mass point of the hard particle 102 is $4.1 \times 10^{-12}$ kg, the hard particle approaches complete follow. Even in this case, even it was assumed that the spring constant K was 100 N/m and the damping constant C was 0.0005 N/(m/s), the hard particle does not follow the convex portion 202 as shown in FIG. 14 since the specific gravity of the hard particle 102 is excessively large.

It may be possible to sufficiently utilize damping by adjusting the respective values as described above.

In this embodiment, the brake device includes the pad 100a having the friction surface 101 and the disk 200a having the friction surface 201 sliding on the friction surface 101. The friction surface 101 includes the hard particles 102 that are elastically supported in a y direction perpendicular to the friction surface 201. The friction surface 201 includes the plurality of convex portions 202 that is disposed in a direction where the friction surface 201 slides on the friction surface 101. When the friction surface 201 slides on the friction surface 101, the hard particles 102 continuously come into contact with the convex portions 202, respectively, while being displaced in the y direction perpendicular to the friction surface 201. Accordingly, the brake device can improve abrasion resistance as compared to a brake device that mainly performs abrasive friction. Further, when the hard particle 102 comes into contact with the next convex portion 202 after coming into contact with one convex portion 202, the hard particle 102 comes into contact with the convex portion 202 at a position lower than the apex of the convex portion 202. Accordingly, the hard particles 102 continuously come into contact with the convex portions 202 so as to follow the convex portions 202, respectively. Therefore, it may be possible to obtain a larger frictional force.

Moreover, in this embodiment, when the friction surface 201 slides on the friction surface 101, the hard particle 102 comes into contact with the friction surface 201 between one convex portion 202 and the next convex portion 202 until the hard particle 102 comes into contact with the next convex portion 202 after coming into contact with one convex portion 202. Accordingly, a frictional force is also generated between the hard particle 102 and the friction surface 201 that is formed between one convex portion 202 and the next convex portion 202. Therefore, it may be possible to obtain a much larger frictional force.

EXAMPLE

A braking force was measured in a brake device that includes a pad 100a having an area of 6000 mm$^2$ and a disk 200a including convex portions 202. The convex portions 202 have the shape shown in FIGS. 6 and 7 and are disposed in the rotation direction of the disk 200a with a gap of 100 μm therebetween. The mass of a mass point of the hard particle 102 is $4.1 \times 10^{-12}$ μg, the diameter of the hard particle is 10 μm, and the specific gravity of the hard particle is 7.85 g/cm$^3$. The sliding speed V of the friction surface 201 of the disk 200a is 5.56 m/s or 30.56 m/s. The speed V of 5.56 m/s corresponds to a case where the speed of an automobile is 40 km/h, and the speed V of 30.56 m/s corresponds to a case where the speed of an automobile is 220 km/h. The load W is $4.7 \times 10^{-4}$ N. The load W of $4.7 \times 10^{-4}$ N corresponds to a case where a pressure is 1 MPa and a density (ratio) is 0.1. The spring constant K is 0.1 N/m. The damping constant C is 0.0002 N/(m/s).

As the result of the measurement of a braking force, when the speed of an automobile was 40 km/h, a braking force of about 1200 N was obtained per pad 100a. Further, when the speed of an automobile was 220 km/h, a braking force of about 1000 N was obtained per pad 100a. These braking force values were the same as those of the brake device in the related art that were greatly abraded. Accordingly, a sufficient braking force was obtained.

A second embodiment of the invention will be described below. In the first embodiment, only the spring characteristics and damping characteristics for the motion in the y direction perpendicular to the friction surfaces 101 and 201 have been described. However, in practice, friction surfaces 101 and 201 are formed in the three-dimensional space. For this reason, if the hard particle 102 is elastically supported even in a direction parallel to the friction surface 201, the hard particle is displaced in the three-dimensional space. Accordingly, in this embodiment, the hard particle 102 is elastically supported even in the direction parallel to the friction surface 201.

Figure 15:
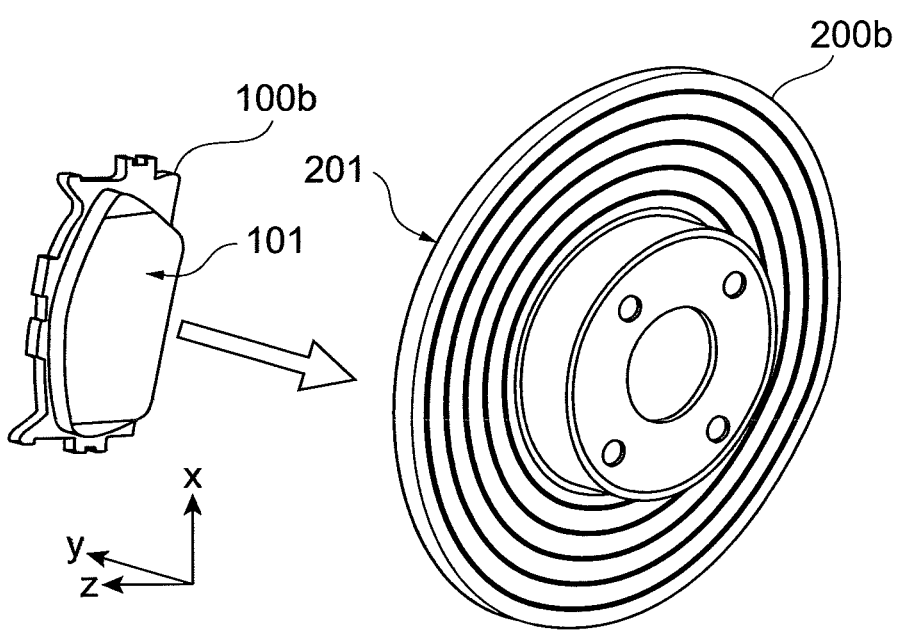
FIG. 15 is a perspective view showing a pad and a disk according to a second embodiment.

Even in this embodiment, a pad 100b is pressed against a rotating disk 200b as shown in FIG. 15, so that a disk brake generates a frictional force.

Figure 16:
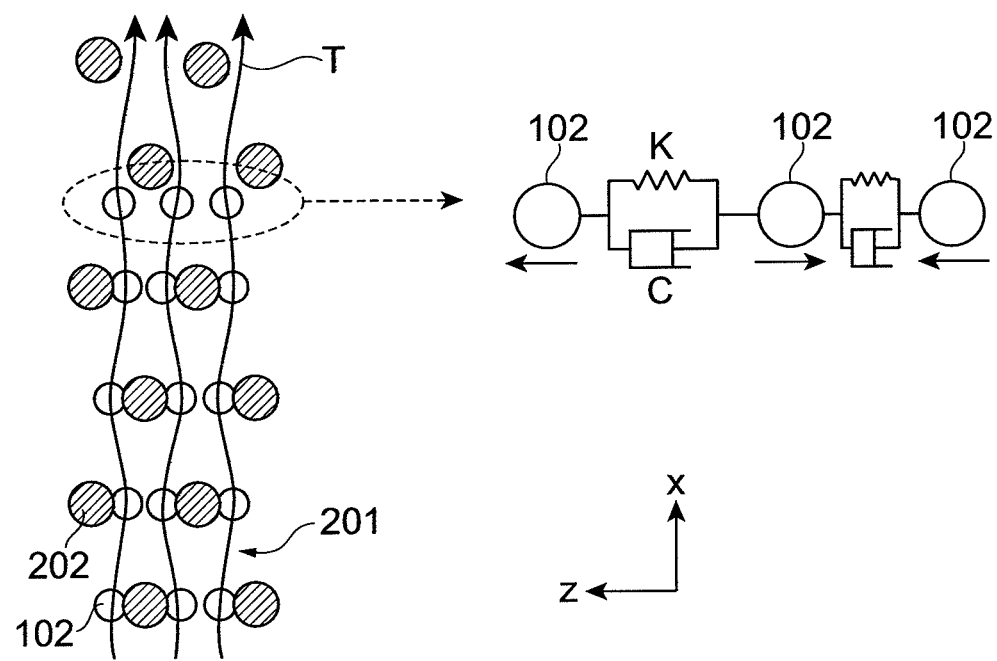
FIG. 16 is a plan view showing a state where the pad and the disk according to the second embodiment come into contact with each other and a model that represents the spring constant and the damping constant of the pad.

As shown in FIG. 16 that is a plan view of the disk pad 100b and the disk 20b viewed in the y direction of FIG. 15, a plurality of hard particles 102 is arranged in a plurality of lines on a friction surface 101 of the pad 100b in a direction where the disk 200a slides on the pad 100a, as in the first embodiment. As shown in a model shown on the right side in FIG. 16, in this embodiment, the hard particles 102 are elastically supported even in a direction parallel to the friction surface 201 so as to have a spring constant K and a damping constant C.

The friction surface 202 includes a plurality of convex portions 202 that is disposed in zigzag so as to form lines in the direction where the friction surface 201 slides on the friction surface 101. When the friction surface 201 slides on the friction surface 101, the hard particles 102 continuously come into contact with the side surfaces of the convex portions 202 that are disposed in zigzag so as to form lines. When the friction surface 201 slides on the friction surface 101, the hard particles 102 continuously come into contact with the side surfaces of the convex portions 202, respectively, while being displaced in a direction parallel to the friction surface 201. When the hard particle 102 comes into contact with the side surface of the next convex portion 202 after coming into contact with the side surface of the convex portion 202, the hard particle 102 comes into contact with the convex portion 202 at a position closer to the center of the convex portion than the side end of the convex portion 202 in a direction perpendicular to the direction where the friction surface 201 slides on the friction surface 101.

Meanwhile, in this embodiment, a pushing force in the y direction perpendicular to the friction surface 201 needs to be larger than a force that pushes the hard particle 102 up in the y direction by an elastic force in the z direction parallel to the friction surface 201.

Figure 17:
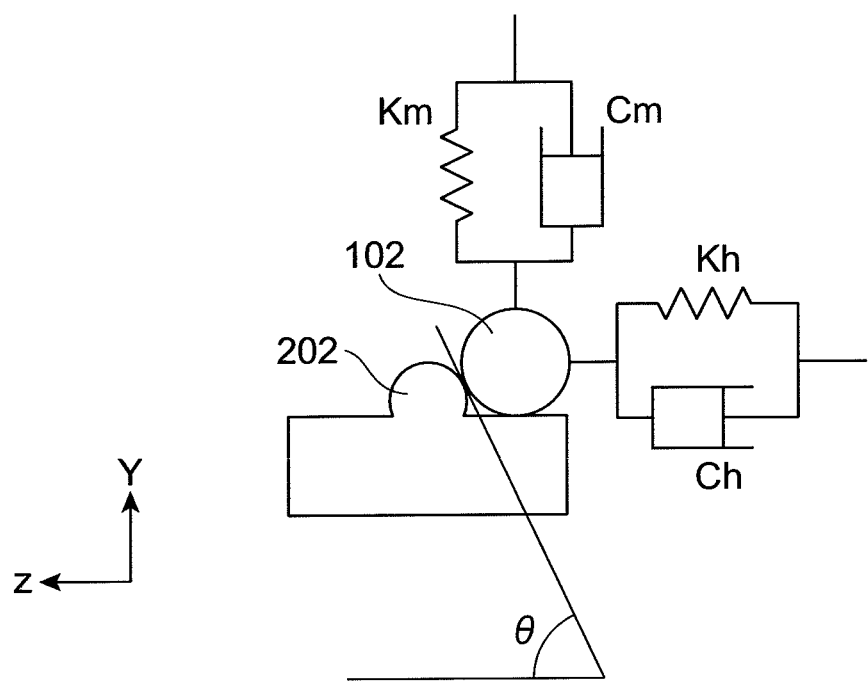
FIG. 17 is a front view showing a state where the pad and the disk according to the second embodiment come into contact with each other and a model that represents the spring constant and the damping constant of the pad.

As shown in FIG. 17, there is assumed a model where the hard particle 102 is elastically supported so as to have a spring constant Km and a damping constant Cm in the y direction perpendicular to the friction surface 201 and so as to have a spring constant Kh and a damping constant Ch in the z direction parallel to the friction surface 201. The height of the convex portion 202 is denoted by H, and the width of the convex portion is denoted by L.

Here, it is assumed that an angle θ between the friction surface 201 and a surface where the hard particle 102 and the convex portion 202 come into contact with each other is substantially 45° (θ≅45°). It is assumed that the hard particle 102 strokes by L/2 in the z direction. A design condition where the hard particle 102 is not displaced by H/10 or more in the y direction is the following expression (20).

[Expression 21]

$$Km \cdot y + Cm \cdot y' > (Kh \cdot x + Ch \cdot x') \tan \theta \quad (20)$$

When the hard particle 102 strokes to the maximum extent in the z direction, the following expression (21) is satisfied.

[Expression 22]

$$y' = x' = 0 \quad x = L/2 \quad \theta \cong 45° \quad (21)$$

When the expression (21) is substituted in the expression (20), the following expression (22) is satisfied.

[Expression 23]

$$Km \cdot Y > Kh \cdot L/2 \quad (22)$$

Accordingly, a sufficient condition of "y<H/10" is the following expression (23). Therefore, the following expression (23) is a desired design condition.

[Expression 24]

$$Kh/Km < H/5 \, L \quad (23)$$

In this embodiment, the hard particles 102 are elastically supported in the direction parallel to the friction surface 201. When the friction surface 201 slides on the friction surface 101, the hard particles 102 continuously come into contact with the side surfaces of the convex portions 202, respectively, while being displaced in the direction parallel to the friction surface 201. When the hard particle 102 comes into contact with the side surface of the next convex portion 202 after coming into contact with the side surface of one convex portion 202, the hard particle 102 comes into contact with the convex portion 202 at a position closer to the center of the convex portion than the side end of the convex portion 202 in a direction perpendicular to the direction where the friction surface 201 moves relative to the friction surface 101. Accordingly, even in the direction parallel to the friction surface 201, the hard particles 102 continuously come into contact with the convex portions 202 so as to follow the convex portions 202, respectively. Therefore, it may be possible to obtain a much larger frictional force.

Further, in this embodiment, the friction surface 201 includes a plurality of convex portions 202 that is disposed in zigzag so as to form lines in the direction where the friction surface 201 slides on the friction surface 101. When the friction surface 201 slides on the friction surface 101, the hard particles 102 continuously come into contact with the side surfaces of the convex portions 202 that are disposed in zigzag so as to form lines. Accordingly, the hard particles 102 more efficiently and continuously come into contact with the side surfaces of the convex portions 202 in the direction parallel to the friction surface 201, respectively. Therefore, it may be possible to obtain a much larger frictional force.

The embodiments of the invention have been described above. However, the invention is not limited to the above-mentioned embodiments, and may have various modifications. For example, an example where the brake device according to the invention is applied to a disk brake has mainly been described in the above-mentioned embodiments. However, the invention may also be applied to a drum brake.

INDUSTRIAL APPLICABILITY

The invention may provide a brake device that can obtain a larger frictional force without sacrificing abrasion resistance.

REFERENCE SIGNS LIST 100a to 100b: pad
101: friction surface
102: hard particle
200a to 200b: disk
201: friction surface
202: convex portion

The invention claimed is:

1. A brake device comprising:
a first friction member that includes a first friction surface; and
a second friction member that includes a second friction surface moving relative to the first friction surface,
wherein the first friction surface includes a plurality of first convex portions that is elastically supported in a direction perpendicular to the second friction surface,
the second friction surface includes a plurality of second convex portions that is disposed in a direction where the second friction surface moves relative to the first friction surface,
when the second friction surface moves relative to the first friction surface, the first convex portions continuously come into contact with the second convex portions, respectively, while being displaced in a direction perpendicular to the second friction surface, and
after coming into contact with a first one of the second convex portions, a first one of the first convex portions comes into contact with a second one of the second convex portions, at a position lower than an apex of the second one of the second convex portions.

2. The brake device according to claim 1,
wherein when the second friction surface moves relative to the first friction surface, the first one of the first convex portions comes into contact with the second friction surface between the first one of the second convex portions and the second one of the second convex portions until the first one of the first convex portions comes into contact with the second one of the second convex portions after coming into contact with first one of the second convex portions.

3. The brake device according to claim 2,
wherein the first convex portions are elastically supported in a direction parallel to the second friction surface,
when the second friction surface moves relative to the first friction surface, the first convex portions continuously come into contact with side surfaces of the second convex portions, respectively, while being displaced in a direction parallel to the second friction surface, and
when the first one of the first convex portions comes into contact with the side surface of the second one of the second convex portions after coming into contact with the side surface of the first one of the second convex portions, the first one o the first convex portions comes into contact with the second one of the second convex portions at a position closer to the center of the second one of the second convex portions than the side end of the second one of the second convex portions in a direction perpendicular to the direction where the second friction surface moves relative to the first friction surface.

4. The brake device according to claim 3,
wherein the second friction surface includes the plurality of second convex portions that is disposed in zigzag so as to form lines in the direction where the second friction surface moves relative to the first friction surface, and
when the second friction surface moves relative to the first friction surface, the first convex portions continuously come into contact with the side surfaces of the second convex portions, which are disposed in zigzag so as to form lines, respectively.

5. The brake device according to claim 1,
wherein the first convex portions are elastically supported in a direction parallel to the second friction surface,
when the second friction surface moves relative to the first friction surface, the first convex portions continuously come into contact with side surfaces of the second convex portions, respectively, while being displaced in a direction parallel to the second friction surface, and
when the first one of the first convex portions comes into contact with the side surface of the second one of the second convex portions after coming into contact with the side surface of the first one of the second convex portions, the first one of the first convex portions comes into contact with the second one of the second convex portions at a position closer to the center of the second one of the second convex portions than the side end of the second one of the second convex portions in a direction perpendicular to the direction where the second friction surface moves relative to the first friction surface.

6. The brake device according to claim 5,
wherein the second friction surface includes the plurality of second convex portions that is disposed in zigzag so as to form lines in the direction where the second friction surface moves relative to the first friction surface, and
when the second friction surface moves relative to the first friction surface, the first convex portions continuously come into contact with the side surfaces of the second convex portions, which are disposed in zigzag so as to form lines, respectively.

* * * * *